(12) United States Patent
Spencer, II

(10) Patent No.: US 9,153,088 B2
(45) Date of Patent: Oct. 6, 2015

(54) RFID FUNCTIONALITY FOR PORTABLE ELECTRONIC DEVICES

(75) Inventor: Carroll Alexis Spencer, II, Wilmington, NC (US)

(73) Assignee: Smart CellCo, Inc., Wilmington, NC (US)

( * ) Notice: Subject to any disclaimer, the term of this patent is extended or adjusted under 35 U.S.C. 154(b) by 0 days.

(21) Appl. No.: 13/454,868

(22) Filed: Apr. 24, 2012

(65) Prior Publication Data

US 2012/0209745 A1 Aug. 16, 2012

Related U.S. Application Data

(63) Continuation-in-part of application No. 12/619,201, filed on Nov. 16, 2009, now Pat. No. 8,251,284, and a continuation-in-part of application No. 11/256,313, filed on Oct. 21, 2005, now Pat. No. 7,635,086.

(60) Provisional application No. 60/621,128, filed on Oct. 22, 2004.

(51) Int. Cl.
| | |
|---|---|
| *H04Q 5/22* | (2006.01) |
| *G07F 7/10* | (2006.01) |
| *G06Q 20/32* | (2012.01) |
| *G06Q 20/34* | (2012.01) |
| *G06Q 30/06* | (2012.01) |
| *G07F 7/08* | (2006.01) |
| *G06Q 50/34* | (2012.01) |

(52) U.S. Cl.
CPC ............ *G07F 7/1008* (2013.01); *G06Q 20/327* (2013.01); *G06Q 20/3278* (2013.01); *G06Q 20/341* (2013.01); *G06Q 30/06* (2013.01); *G06Q 50/34* (2013.01); *G07F 7/0886* (2013.01)

(58) Field of Classification Search
USPC ........................ 235/380, 384; 705/5; 340/10.1
See application file for complete search history.

(56) References Cited

U.S. PATENT DOCUMENTS

| | | |
|---|---|---|
| 5,515,045 A | 5/1996 | Tak |
| 5,528,222 A | 6/1996 | Moskowitz et al. |
| 5,555,550 A | 9/1996 | Kaschke |
| 6,052,606 A | 4/2000 | Bowen |
| 6,073,840 A | 6/2000 | Marlon |
| 6,424,845 B1 | 7/2002 | Emmoft et al. |
| 6,456,039 B1 | 9/2002 | Lauper et al. |

(Continued)

OTHER PUBLICATIONS

Sorkin, Andrew Ross, "Taking Virgin's Brand Into Internet Territory; Richard Branson Says the Web Is Ready for His Style of Business", Feb. 14, 2000, The New York Times.

*Primary Examiner* — Daniel Hess
(74) *Attorney, Agent, or Firm* — Triangle Patents, PLLC

(57) ABSTRACT

A system for business wireless mobile transactions for electronic hand-held devices including a mobile electronic communication device including a dedicated communication component and a dedicated activatable component; a trigger, a good or service, and an application server; wherein the device and the dedicated communication component are operable for communication with RFID/NFC transceivers when the device is located within a predetermined proximity of a transceiver; and wherein the trigger activates the device to electronically initiate a business transaction for the good or service on the application server when the device detects activation of the dedicated activatable component by the trigger. The system can further include a financial transaction server. Methods of using the system for conducting business or social transactions are also included.

17 Claims, 7 Drawing Sheets

(56) References Cited

U.S. PATENT DOCUMENTS

| | | |
|---|---|---|
| 6,751,525 B1 | 6/2004 | Crisp, III |
| 7,146,149 B1 * | 12/2006 | Krishnamurthi ............... 455/318 |
| 7,635,086 B2 | 12/2009 | Spencer, II |
| 7,837,557 B2 | 11/2010 | Boyd |
| 2001/0034237 A1 | 10/2001 | Garahi |
| 2002/0032601 A1 * | 3/2002 | Admasu et al. ................. 705/13 |
| 2002/0111213 A1 | 8/2002 | McEntee et al. |
| 2003/0146821 A1 | 8/2003 | Brandt |
| 2005/0051622 A1 * | 3/2005 | Mak ................................ 235/384 |
| 2007/0190941 A1 * | 8/2007 | Fein et al. ...................... 455/41.2 |
| 2007/0244731 A1 * | 10/2007 | Barhydt et al. ..................... 705/5 |
| 2009/0070157 A1 * | 3/2009 | Weitman ............................ 705/5 |
| 2012/0323664 A1 * | 12/2012 | Klems ......................... 705/14.26 |
| 2013/0005404 A1 * | 1/2013 | Bremer .......................... 455/566 |

\* cited by examiner

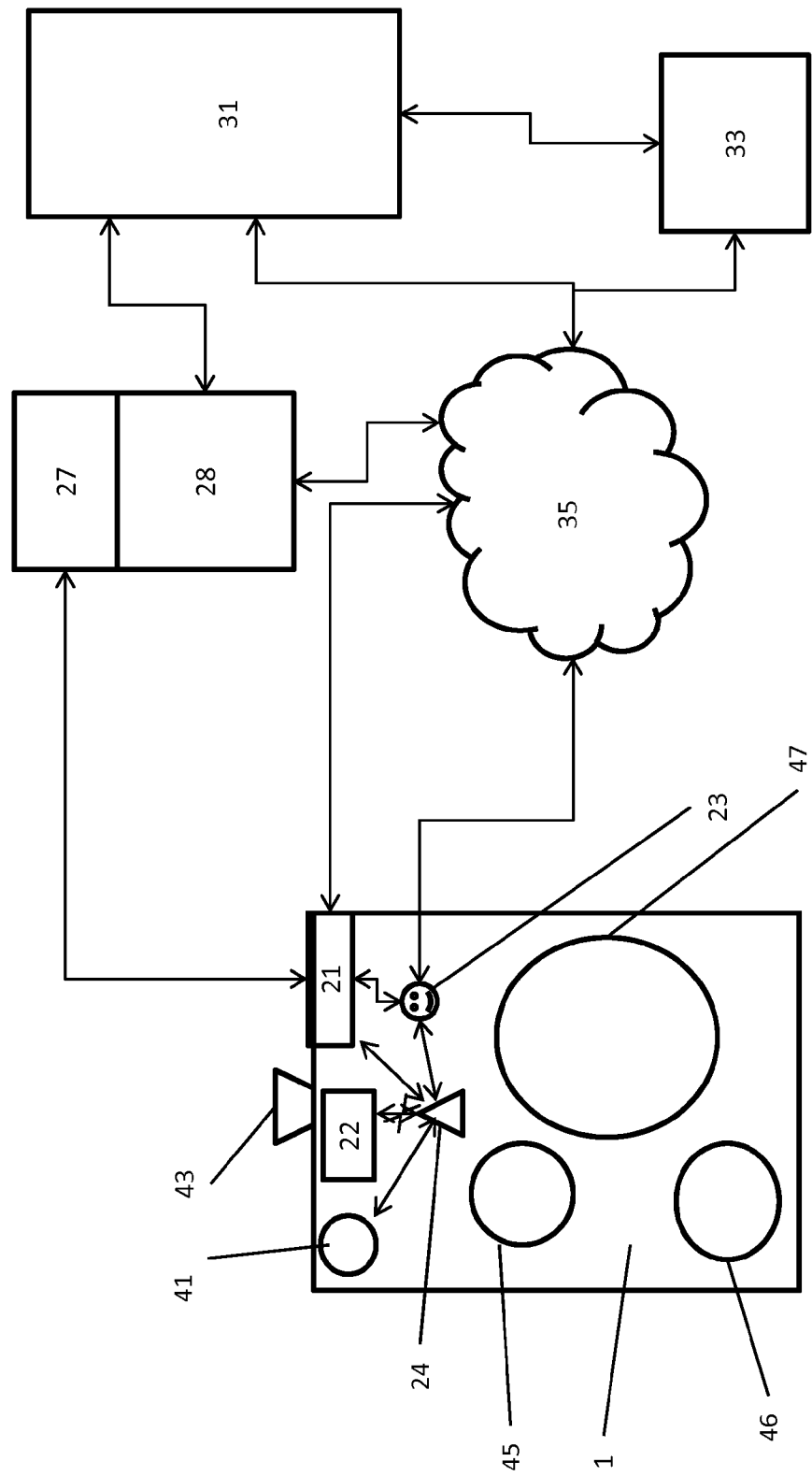

RFID FUNCTIONALITY FOR PORTABLE ELECTRONIC DEVICES

CROSS-REFERENCE TO RELATED APPLICATIONS

The present invention is related to U.S. Provisional Patent Application Ser. No. 60/621,128, filed on Oct. 22, 2004, U.S. patent application Ser. No. 11/256,313, filed on Oct. 21, 2005; and U.S. patent application Ser. No. 12/619,201, filed on Nov. 16, 2009; it is a continuation in part of these application, claims priority therefrom, and incorporates them herein by reference in their entirety.

BACKGROUND OF THE INVENTION (1) Field of the Invention

The present invention relates generally to marketing and sales tools involving user interfaces on portable devices, and, more particularly, to strategic placement of radio frequency identifiers and/or radio frequency identification devices (RFID/NFC) on, within, connected and/or integrated with portable electronic device housings including all connective components and/or embedded components or circuitry internal and/or external to the device itself and/or associated software, including applications for wireless devices.

(2) Description of the Prior Art

Brand strategy is the business of developing brands based on thorough marketing knowledge and insight. It is a physical expression of how a business direction and key messages will communicate and establish value effectively across a broad range using several mediums to enhance awareness, impact and equity of the brand. In short increasing companies "goodwill," which is often more valuable than the break-up value of the company's assets. Marketing often takes advantage of the interface between a consumer and an object to create intangible value in the form of branding some business' product or service. Examples of such interfaces include billboards, packaging, and electronic displays (TV screens and computer monitors). Use of such interfaces creates commercial goodwill helping businesses sell their products and/or services.

Recently, in today's mobile information society, an unexploited and increasingly ubiquitous consumer-object interface has arisen, namely the use of wireless devices as an integral part of daily living. Although such devices often advertise the manufacturer of the device itself by including an identifying mark somewhere on the device, generally such marks are not interactive or functional and do not provide the end user with any true commercial function, in our model the consumer may through the mark and/or audio cue, trigger, waveform, signature, command and/or visual cue, trigger, command, signature, waveform itself interact in some way with the business, its product or services/functionality of his/her choice. The mark is non-functional at present. Thus, there is a need and opportunity for functional overlays, or marks on wireless devices that function to induce and/or permit a consumer to interact with a business, its product or services, i.e., to purchase, order, request information or conduct some other business-related, gaming, advertising/action and/or transaction using the user interface. RFID/NFC is defined as follows as it relates to this invention and can be present on the case, cover, covering, encasement, overlay or wrapping or device housings including all connective components and/or embedded components or circuitry internal and/or external to the device itself and/or associated software. Radio Frequency Identification Technology to include Active RFID/NFC, Passive RFID/NFC, and newer technologies being developed in RFID or variation(s) such as Near Field Communication herein referred to as (RFID/NFC)(Not meant to limit scope of other iterations of RFID such as, for example, Zigbee, RFID/NFC enabled EMV, etc. Active RFID/NFC is typically either powered or uses a transponder type system which actively emits and/or receives in some manner. Passive RFID/NFC technology is typically activated by reflecting a signal emitted from an external reader or electronic device. An example of passive RFID/NFC technology is the Speedpass™ system manufactured by Texas Instruments, Inc. and distributed by Exxon/Mobil, Inc. Newer technologies being developed include such variations as Near Field Communication RFID/NFC which in its simplest form can combine advances such as more secure communications accomplished by in one variation touch of one device to another. These examples are not meant to exclude any variation of RFID/NFC, but to include both past, present, and future forms of Radio Frequency Identification technology and their various embodiments for single and multiple purposes known at the present as RFID, Near Field Communication (ie. NFC), Contactless, Zigbee, EMV variations, Internal Integrated Circuits and/or associated firmware, software, hardware, and/or wireless SD cards (or like), combinations and/or variations therein.

SUMMARY OF THE INVENTION

The present invention is directed to a system for business wireless mobile transactions for electronic hand-held devices according to the present invention includes a mobile electronic communication device including a dedicated communication component and a dedicated activatable component; a trigger, a good or service, and an application server; wherein the device and the dedicated communication component are operable for communication with RFID/NFC transceivers when the device is located within a predetermined proximity of a transceiver; and wherein the trigger activates the device to electronically initiate a business transaction for the good or service on the application server when the device detects activation of the dedicated activatable component by the trigger, thereby providing a system for semi-automated business transaction for electronic handheld devices. The system may further include a financial transaction server, wherein the application server initiates a financial transaction on the financial transaction server.

These and other aspects of the present invention will become apparent to those skilled in the field or discipline after reading of the following description of the preferred embodiment when considered with the drawings.

BRIEF DESCRIPTION OF THE DRAWINGS

FIG. 7 is a schematic diagram showing relationships of another embodiment of a system according to the present invention.

DETAILED DESCRIPTION OF THE INVENTION

Figure 1:
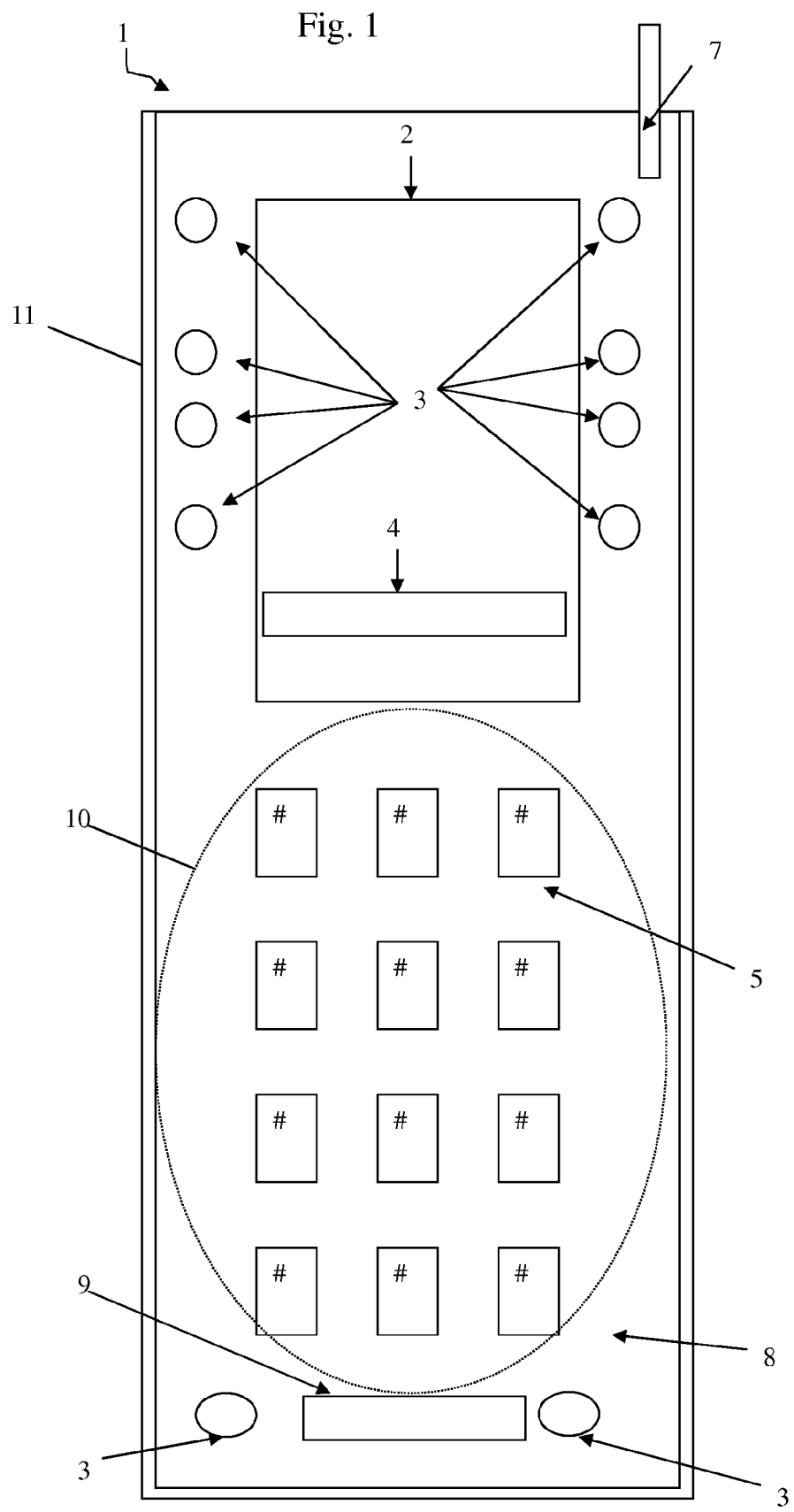
FIG. 1 is a front view of a cell phone according to one embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

The present invention provides for a housing including all connective components and/or embedded components or circuitry internal to the device itself for a phone, cellular, wireless device(s) or electronic device such as cell phones/hybrid cell phones or personal digital assistants, or electronic music device, such as an MP3 player, the invention including functional keys and RFID/NFC-based devices attached to, integrated, connected to, embedded in, removably attached whether locally or at a distance or integrated with the housings including all connective components and/or embedded components or circuitry internal to the device itself, for these electronic devices, and any combination thereof and having the following capabilities:

The present invention further provides for a housing including, but not limited to, all connective components and/or embedded components or circuitry internal/external to the device itself, the display that combines marks, logos or information displayed through various means/printed on the functional keys and is tied to software resident on the phone or within its memory or downloaded to the phone via wireless communication or other means and that activates a functionality, service or points the device to a web site when a series of activatable components or a single/multi-activatable component is activated and the RFID/NFC is in communication with an appropriate RFID/NFC transceiver and/or other such transceiver. Preferably, the software may be included with the housing or case housing including, but not limited to, all connective components and/or embedded components or circuitry internal and/or external to the device itself and/or associated software, such as included on an embedded microchip or microprocessor, downloadable software, software resident on the electronic communication and/or entertainment device, software updates thereto, and combinations thereof. The software provides for the functionality of the functional or facilitation activation component as set forth in this description. Also, preferably, the software permits the activation components to associate with GPS and/or Assisted GPS and/or visual/sound recognition for location-based services provided when the RFID/NFC-operable housing including any or all of its connective components including, but not limited to, all connective components and/or embedded components or circuitry internal and/or external to the device and/or associated software itself or that fully encases the electronic device is taken by the user within a predetermined proximity of a business or machine having RFID/NFC transceiver capabilities or other such transceiver capabilities and is programmed for communication with the device, in particular when activated by the user.

The present invention provides a device and method for marketing a business through a housing having a RFID/NFC device connected, embedded, inserted or attached thereto, wherein the housing including, but not limited to, all connective components and/or embedded components or circuitry internal and/or external to the device itself and/or associated software, or fully/partially encloses or encases a wireless device and provides a user interface for the user to perform transactions with the device, the device also having strategic placement of functional branding overlaid on single/multi-function activatable components of the device, as well as to a method of using the same.

The present invention provides RFID/NFC-operable housings including, but not limited to, all connective components and/or embedded components or circuitry internal and/or external to the device and/or associated software itself, for wireless devices, the housings including RFID/NFC devices connected, embedded, inserted or attached thereto and the housings including, but not limited to, all connective components and/or embedded components or circuitry internal and/or external to the device and/or associated software having a mark or logo or informative identifier, something immediately recognized by the consumer as a functional key or functional overlay, which is operable for performing a dedicated transaction when activated by the user; this will be known from this point forward as the single/multi-function activatable component(s).

Preferably, the case or housing including, but not limited to, all connective components and/or embedded components or circuitry internal and/or external to the device and/or associated software itself, includes materials that are natural, synthetic, and combinations thereof. By way of example and not limitation, polymeric or plastic material, neoprene, GORE-TEX, graphene, leather, and the like are used. Preferably, performance enhancements such as water-resistance, temperature insulative, impact resistance are used. Also, preferably, materials capable of coloration, imprinting, and other aesthetically modifiable surfaces are used for personalization, branding, etc.

Accessory cases or housings of the prior art may already include branding marks, such as company logos which work on the specific brand or device makers equipment; however, nowhere in the prior art exists a generic and/or device specific housing including, but not limited to, all connective components and/or embedded components or circuitry internal and/or external to the device and/or associated software itself, or case including, but not limited to, all connective components and/or embedded components or circuitry internal and/or external to the device and/or associated software that partially and/or fully encloses or fully encases the phone or portable communication or portable electronic device wherein the housing or case includes RFID/NFC functionality included in, on, or integrated with the housing or case including, but not limited to, all connective components and/or embedded components or circuitry internal and/or external to the device and/or associated software itself which can function either dependent and/or independently of the phone or electronic device. In one embodiment, the housing including, but not limited to, all connective components and/or embedded components or circuitry internal and/or external to the device and/or associated software in and of itself serves to protect the actual hardware of the device as well as serving as a mini-billboard for advertising and/or as a storage vessel for the RFID/NFC microchips or download recipient of a data chip. Importantly, it can be a protective encasement while at the same time having singular or dual functionality with also the capability of having branding that has operability or functionality in addition to merely being branding or advertising, while also the branding and/or subsidization through the mobile wallet (possibly using an RFID/NFC base) utilizing the foregoing for customer, carrier and/or device manufacturer payment offsets also having the potential of revenue generation to support the cost associated with the functionality, usage and/or distribution elements of the wireless device, RFID and/or NFC, gaming and/or associated software/hardware including but not limited to development cost, sales cost, marketing cost, distribution cost of the RFID/NFC and/or single/multi-function activatable components and/or trigger(s)/cue(s)/waveform(s) and the like . . . . Account creation in respect to the foregoing and data linking utilizing payment methods is also envisioned. Such abilities may include gaming offsets, payment acceptance, rewards, tokens, and/or sliding reduced payment fees for voice/data/services/applications/free services of the foregoing or possibly free service(s) to in variations include voice and/or data services entirely.

Also, the present invention is operable to provide RFID/NFC lottery and/or gaming payment system for a device having the housing including, but not limited to, all connective components and/or embedded components or circuitry internal and/or external to the device and/or associated software with RFID/NFC and/or functionality of the case or housing including, but not limited to, all connective components and/or embedded components or circuitry internal and/or external to the device and/or associated software itself, according to the present invention. For example, a convenience store or self-serve type lottery stations (like a vending machine) would be RFID/NFC-enabled so that users having the housing including, but not limited to, all connective components and/or embedded components or circuitry internal and/or external to the device and/or associated software itself with RFID/NFC for the portable electronic devices automatically purchase tickets through payment on the user's account associated with their personal RFID/NFC on, in, embedded within internal circuitry to the device and associated housing, connected to or integrated with the housing or case (including, but not limited to, all connective components and/or embedded components or circuitry internal and/or external to the device and/or associated software) for the device. Alternatively, the electronic downloading of the ticket information or advertising to users having the RFID/NFC-functional housings including, but not limited to, all connective components and/or embedded components or circuitry internal and/or external to the device and/or associated software itself or cases for the electronic device. The operability of the RFID/NFC-enabled device housing or case including, but not limited to, all connective components and/or embedded components or circuitry internal and/or external to the device and/or associated software itself can be associated with proximity to a business or machine that is RFID/NFC-communication enabled or other such trigger enabled means as set forth, such as credit card purchases, or pre-paid debit or credit cards purchases, or other payment acceptance variations, in particular in the case of lottery ticket purchases. Branding, marketing, subsidization, distribution and/or cost offsets and utilization of various trigger(s) for reinforcement of the lottery or other games and/or other data links and/or offers in conjunction with and/or via RFID/NFC-operable housing or cases including, but not limited to, all connective components and/or embedded components or circuitry internal and/or external to the device and/or associated software itself is capable and not meant to limit scope or utilization.

The present invention provides a housing or case including, but not limited to, all connective components and/or embedded components or circuitry internal and/or external to the device itself for cell phones/wireless devices/portable electronic devices/digital cameras/PDAs/hybrid cell phones, or smart phones and portable music players that has trigger(s) and/or RFID/NFC or Mobile Commerce component built into the case (see inclusive language for case and/or housing below) itself or attached through some means to the case or housing including, but not limited to, all connective components and/or embedded components or circuitry internal and/or external to the device itself. The RFID/NFC component can be either active or passive (as can be the (trigger(s)) and can include advances in current RFID/NFC technology including near field communication, swipe-based systems, connected and/or associated triggers which could be various internal/external, input/output such as used for data linking separately and/or together be it visual, and/or audio and/or use-at-a-distance. Other forms of mobile commerce are also included such that the device becomes a functioning mobile wallet, debit or charge-based system, or identification or token based system such as is used within a subway system.

Examples of systems currently in place that are operable to utilize the new combinations, including key overlays, RFID/NFC-devices embedded in, inserted in, connected to, or integrated with housings including, but not limited to, all connective components and/or embedded components or circuitry internal and/or external to the device and/or associated software itself, trigger based system separately and/or together with the aforesaid capabilities for the devices, and combinations thereof, associated with the present invention include, but are not limited to the Exxon/Mobil Speedpass™ system or American Express Inc., ExpressPay™ for RFID/NFC payment or Mastercard's Paypass™ system, which is being developed for commercial application by MasterCard, Inc.

Figure 2:
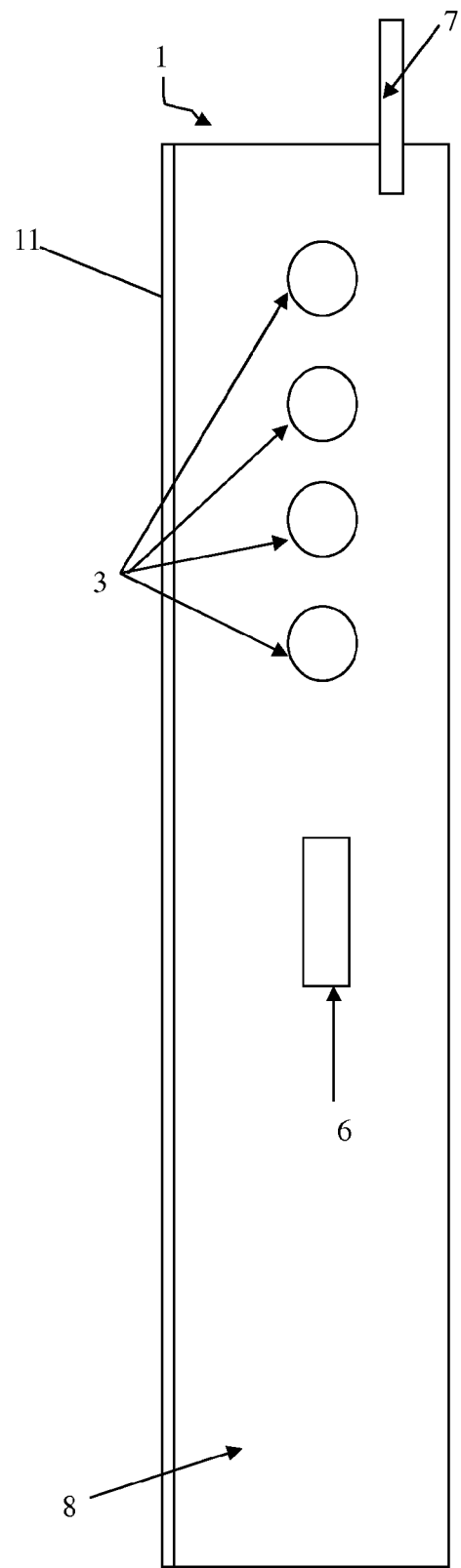
FIG. 2 is a side view of a cell phone according to one embodiment of the present invention.
Figure 3:
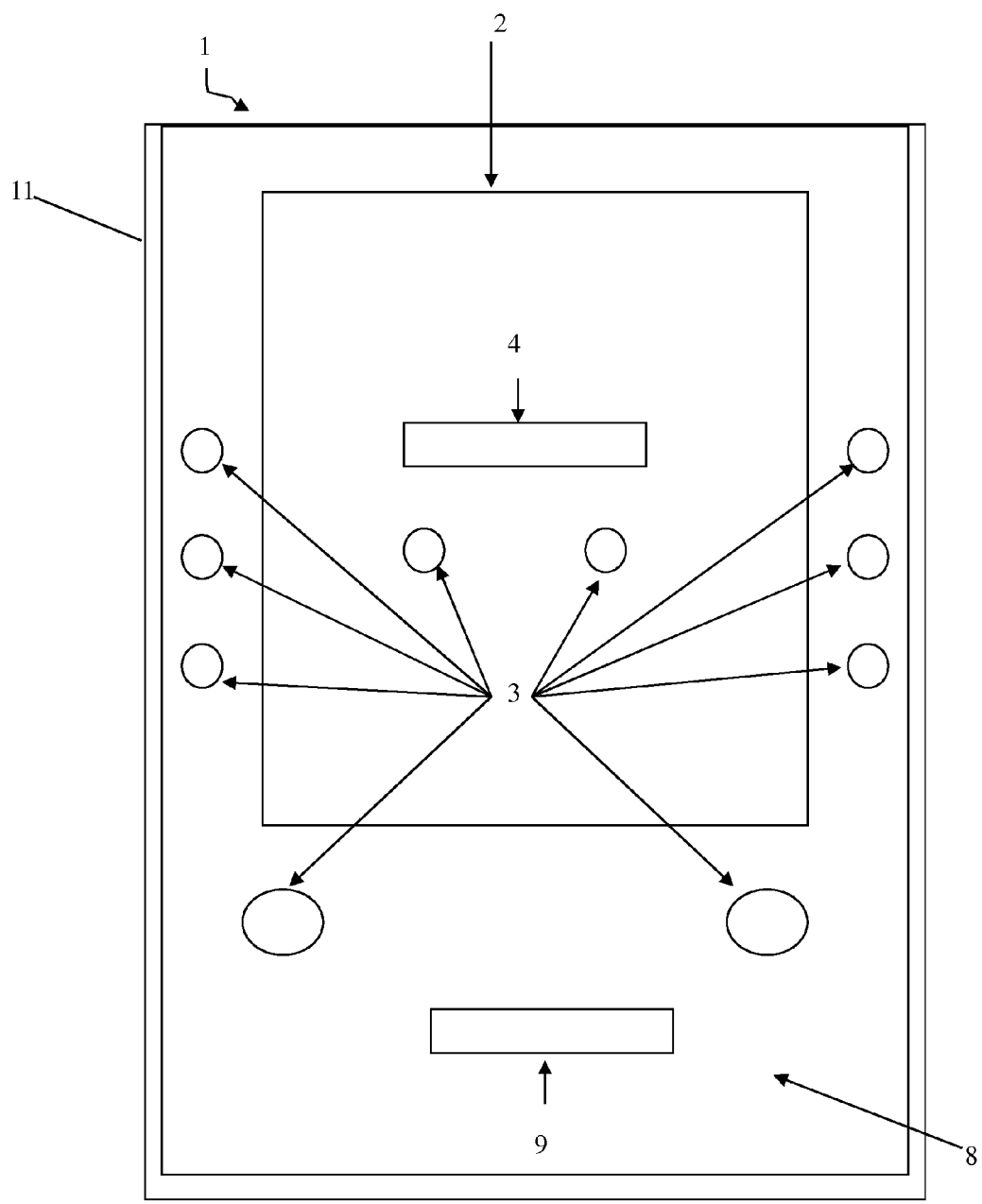
FIG. 3 is a front view of a personal digital assistant according to one embodiment of the present invention.
Figure 4:
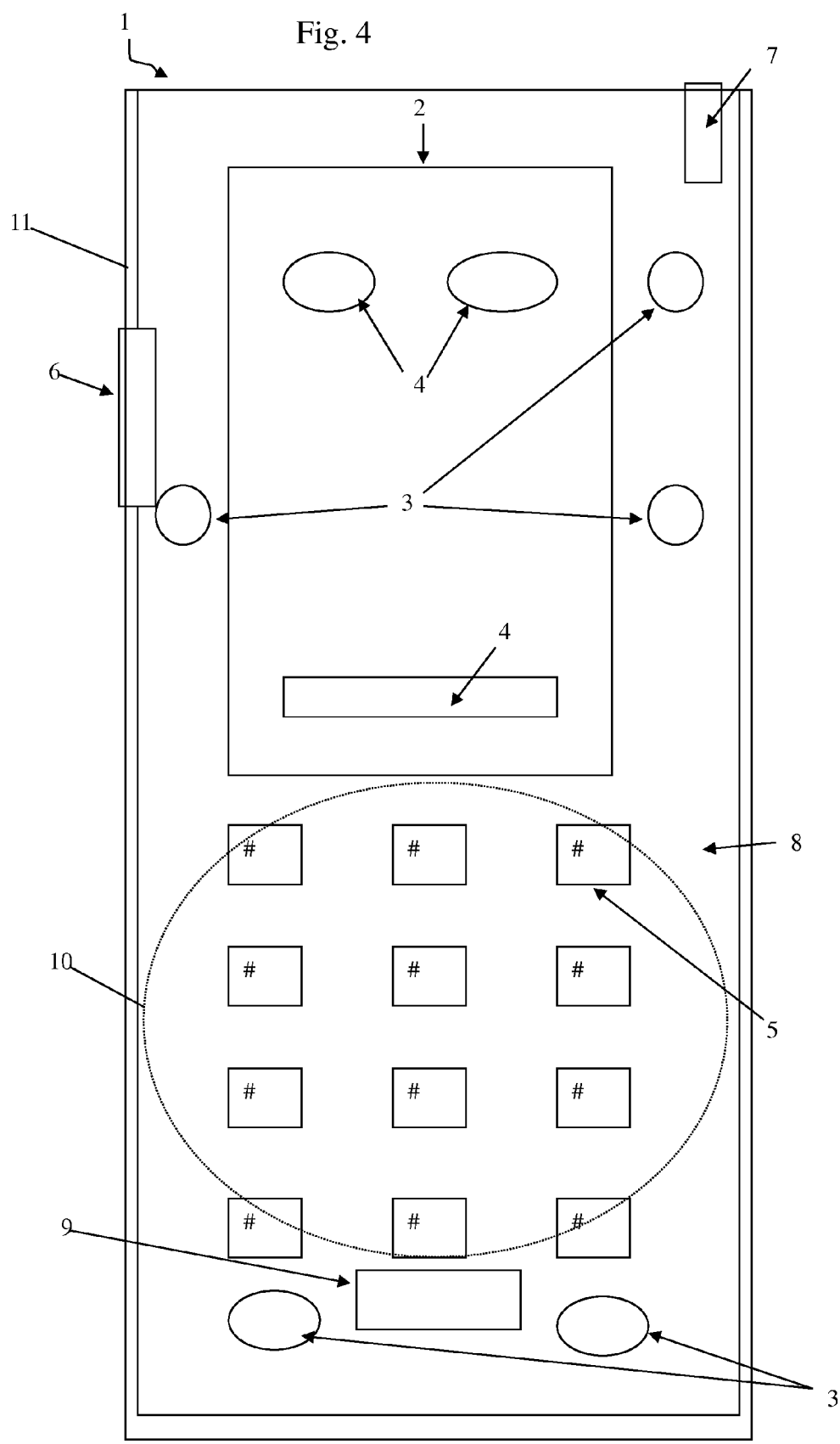
FIG. 4 is a front view of a hybrid wireless device-personal digital assistant according to one embodiment of the present invention.

Referring now to the drawings in general, the illustrations are for the purpose of describing a preferred embodiment of the invention and are not intended to limit the invention thereto. FIGS. 1 and 2, FIG. 3 and FIG. 4 illustrate preferred embodiments of the invention on wireless devices referred to generally with the reference numeral 1. Wireless devices are broad in device but for our purposes at present include cell phones, personal digital assistants (PDAs), and/or portable wireless electronic type devices, hybrids of cell phones and smartphones. Traditional telephones are known in the art and include handsets having keypads thereon. FIGS. 1 and 2 illustrate the invention on a cell phone. FIG. 3 illustrates one embodiment of the present invention on a PDA. FIG. 4 illustrates the invention on a hybrid wireless device-PDA.

The present invention provides for strategic placement of key overlays and/or overlay(s), in particular for wireless devices, so they are directly associated with a functional or facilitation component, namely a single/multi-function activatable component. Preferably, the key overlays and/or overlay(s) are marks such as brands, names, symbols, logos, trademarks or labels. Alternatively, the key overlays and/or overlay(s) may also include generic words such as "buy", "sell", etc.

The functional or facilitation components of the wireless device form part of the user interface between the device and the user or consumer that is embodied in the telephone key overlay and/or (overlay(s). Referring now to FIGS. 1 and 2, and FIG. 3 and FIG. 4, in a preferred embodiment, a housing including, but not limited to, all connective components and/or embedded components or circuitry internal and/or external to the device itself, having an RFID/NFC device connected, inserted or attached thereto or integrated therewith also further includes a single/multi-function activatable component. Referring to FIGS. 1, 2, 3 and 4, the phone or cellular phone components may further include an electronic display 2, physical buttons 3, or other interactive components on wireless devices, such as a virtual keyboard or virtual buttons that are produced by projection, electronic display, capacitive touch and/or light detection means.

An activatable component to which a brand or mark has been applied is considered a marked or identified activatable component. More than one functional component may be marked or identified on a wireless device.

In the case of an electronic display 2, a key overlay may be applied by electronic display of an electronic or digital button 4 based upon its location on the surface of the telephone keypad that corresponds to a location over the phone display when the overlay is applied to the phone. An electronic display may be a touch screen. The user of the device interacts with the company whose mark is used as the key overlay and/or overlay(s) by activating or pressing the single/multi-function activatable component so marked; a business-related action and/or transaction occurs by that activation of the single/multi-function activatable component by the user, e.g., a product is purchased, such as a beverage being purchased on location using equipment or from a machine that is programmed to communicate with the wireless device. A user or consumer may touch the electronically displayed key overlay and/or overlay(s) to achieve some action and/or transactional end as with a physical function button directly located on the phone or cellular/wireless device itself.

In a preferred embodiment, the RFID/NFC device associated with the housing including, but not limited to, all connective components and/or embedded components or circuitry internal and/or external to the device and/or associated software itself that fully and/or partially encloses a device when applied thereto further can include a functional key overlay and/or overlay(s) for the electronic device, wherein the RFID/NFC device and the functional key overlay and/or overlay(s) separately and/or together is pre-programmed, programmable and/or may be predetermined by the manufacturer. The RFID/NFC and/or functional overlay separately and/or together may be considered dedicated to the services, products, functions associated with mark and/or trigger(s) with which it is identified, i.e., it serves a practical marketing and advertising function that provides business value to the business associated with the branding, as well as making the housing including, but not limited to, all connective components and/or embedded components or circuitry internal and/or external to the device and/or associated software itself and device operable for performing business transactions with the company, or operating to perform a service provided by the company, such as security passage or authorization, user identification or authorization for proximity or security clearance, attendance, presence within a predetermined proximity, or tracking of the device via the RFID and/or NFC and/or variations including trigger(s) in the housing including, but not limited to, all connective components and/or embedded components or circuitry internal and/or external to the device and/or associated software itself. Data linking of the housing including, but not limited to, all connective components and/or embedded components or circuitry internal and/or external to the device itself and/or associated software, with RFID and/or NFC variations including trigger(s) operability is also provided with the present invention. Alternatively, a user or consumer programs a functional component to a functional key and/or functional overlay(s).

In a preferred embodiment, the RFID/NFC device attached to, connected to, embedded, integrated with, or inserted in the housing including, but not limited to, all connective components and/or embedded components or circuitry internal and/or external to the device itself and/or associated software, and the key overlay(s) and their corresponding activatable components may be located anywhere on the housing and the corresponding surface of the phone or wireless device thereunder including areas designated for display through a variety of means and/or interaction; the key overlay(s) may be juxtaposition physical buttons and/or electronic and/or electronically displayed on the phone or wireless device itself. Also, there may be at least one, but preferably a multiplicity of functional key overlay(s) and related or corresponding functional components, i.e., individual physical buttons and/or electronic and/or electronically displayed and/or areas designated for display through a variety of means and/or interaction. Additionally or alternatively, each activatable component may have more than one functional key overlay associated therewith or corresponding thereto. Preferably, each single/multi-function activatable component has at least one functional key overlay and may function at a distance and/or without additional user action required.

In FIGS. 1, 2, 3 and 4, the functional key overlay's position relative to the activatable component or button is represented by the arrows from component 8 indicating empty spaces or zones on a wireless device 1 that are proximal to the activatable components but not directly on the components or buttons themselves. In one preferred embodiment, as seen in FIG. 2 and FIG. 4, a functional key overlay 6 is placed on the surface of the telephone that corresponds to a functional component located on a side of the wireless device 1.

By way of example but not limitation, the following design example provides a description of the application of the RFID/NFC-operable housing including, but not limited to, all connective components and/or embedded components or circuitry internal and/or external to the device and/or associated software itself applied to a particular hand-held electronic device, namely a cellular phone. Functional components on the phone under the functional telephone key overlay include components like numeric buttons normally found on a phone or wireless device or components added to a phone or wireless device for more function options for consumers. Also, the functional components may have various shapes and sizes, so long as they are sized and configured for use by the user of the device. A functional key overlay may also be placed on a component in electronic form or electronically displayed format for which a function button is not normally associated. By way of example, not limitation, as seen in FIGS. 1 and 2 and FIG. 4, a functional key overlay is placed on or connected through software and/or firmware to an antenna 7 attached to wireless device 1.

A user or consumer interacts with a phone or phone-capable wireless device for some interactive purpose. In a preferred embodiment, functional components on the phone or wireless device may serve numerous functions including dialing, connecting, starting or transacting. These functions serve to implement the consumer or user's interactive purpose, i.e., to make a business-related action and/or transaction without requiring additional user action. In a preferred embodiment, a consumer or user activates, selects or presses a marked functional key overlay associated with a component on a wireless device, such as a physical and/or electronically displayed function button, and the device interacts with the company represented by that identifier, e.g., by making a business action and/or transaction or purchase using a credit card or by dialing a phone number to connect a consumer or user to a predetermined destination such as a business's information, help, service or product center, or professional services group tracking previously ordered product without requiring additional user action. Note that the user may provide additional information, such as a unique user identifier or authorization or confirmation of the action and/or transaction, at a subsequent level in the interaction with the company, its products and/or services, although establishing the initial interaction with the company does not require additional user action.

Also, the present invention provides for RFID/NFC-based housing including, but not limited to, all connective components and/or embedded components or circuitry internal and/or external to the device itself and/or associated software to be operable for secure payment for any transaction authorized by the user from the device having the housing including, but not limited to, all connective components and/or embedded components or circuitry internal and/or external to the device and/or associated software and RFID and/or NFC variation(s) and/or trigger(s), overlay(s) operability. Such a payment system may be integrated with SMS, MMS or other notification and/or PIN or other identification response system to ensure that the transaction is properly authorized, recorded or documented and processed in such a manner to preserve user account and identification security. By way of example and not limitation, the user in possession of a portable hand-held electronic device with the "smart" housing including, but not limited to, all connective components and/or embedded components or circuitry internal and/or external to the device and/or associated software itself having RFID/NFC operability and/or functional key overlay moves into proximity of a business, location or other machine that is RFID/NFC-operable having receiver/transmitter or other various transceiver capabilities including sound/visual trigger and processing capability for the purpose of conducting a transaction such as product or service purchase, and the RFID/NFC-operable housing including, but not limited to, all connective components and/or embedded components or circuitry internal and/or external to the device and/or associated software enables the user of the device to process the intended transaction in a secure, user-authorized manner as set forth herein.

In another preferred embodiment, interaction with a functional component permits a consumer or user to facilitate actions and/or transactions, including those having an education component. These actions and/or transactions may include the purchasing, depositing, transferring and charging to or from another institution, or other financial transactions or actions, including education and information-based actions. Such actions and/or transactions may include stock market related transactions such as the buying, or selling of securities related instruments. Actions and/or transactions may also include the use of gaming, gaming currency and/or tokens, credit cards, debit cards, prepaid cards, stored value cards, open loop, closed loop hybrid loop, loyalty, EMV, EMV/NFC, virtualized combinations of the aforesaid, and/or smart cards. In one preferred embodiment, the mark of a credit card company may be placed on/beneath/around or near the component or button(s) and when the consumer executes the component or button (electronic or other as previously described) the account of the consumer will be debited for the purchase. In another preferred embodiment, a beverage company's logo may be placed on/beneath/around or near the component or button(s) and the consumer purchases a beverage from a vending machine by pressing the component or button(s) identified by a mark of the beverage company. In another preferred embodiment, a consumer's financial institution has its logo placed on/beneath/around or near a button(s) and the consumer may interact with his or her account by pressing or selecting the component or button(s). In another preferred embodiment, a branded activatable component is used as an aid to facilitate discounting and other promotional and advertising facilities.

In another embodiment, the user's interaction with a company, and its products or services via a functional component on a phone or wireless device may also connect and/or trigger a consumer or user to a website, cloud based ASP service, App or portal connected to or on the Internet, from here the consumer can download a menu, from here the client could choose the direction to take, such as purchasing, checking account status and new deals or specials. The website cloud based ASP service, App or portal may be an Internet service, chat service, on-line store, or may be a hosted ASP site and/or subsequent cloud based derivative, or any pre-determined Internet destination including B2B, and B2C. Also, activation of the functional component or button may launch another service, like messaging services, such as AOL Instant Messenger provided by America On-Line, which are not website-dependent. As set forth in the foregoing, in a preferred embodiment the invention includes the option of the user preprogramming the destinations of their choice.

In another embodiment, interaction with a functional component starts a device such as a computer, a car, a radio, a television, or any electronic or mechanical device and could also include the retrieval of data such as lights on, and TV's off, even so far as being able to indicate or trigger an electronic-based security system of one's domicile.

A key aspect of this invention is any use of a marked functional key overlay or overlay on the RFID/NFC-operable housing including, but not limited to, all connective components and/or embedded components or circuitry internal and/or external to the device itself and/or associated software to reinforce brand consciousness or awareness in the consumer or user. Single logo, mark, slogan or multiples may be used on the housing including, but not limited to, all connective components and/or embedded components or circuitry internal and/or external to the device itself and associated/or associated software and/or functional key overlay. The combination of the mark and the functional component as well as the RFID/NFC, whether active or passive, facilitates actions/business actions and/or transactions by reducing the time for the user to implement an action and/or transaction. Transactions and/or actions are made more efficient, due to the fact that the consumer can quickly and easily scan a wireless device and immediately identify the mark associated with the action and/or transaction the consumer needs to implement or by using the RFID/NFC operability associated with the housing including, but not limited to, all connective components and/or embedded components or circuitry internal and/or external to the device and/or associated software on the device; since housings are manufactured for specific devices, in an alternative embodiment the type and function of the RFID/NFC operation is determined by the type of device for which the housing including, but not limited to, all connective components and/or embedded components or circuitry internal and/or external to the device itself and associated software will be used. In addition, the marks on the wireless device serve a marketing function, namely branding, independent of their relationship with the functional component.

Another preferred embodiment is the method of marketing a business and/or reinforcing brand awareness through a wireless device interface including the step of applying functional key overlays and/or overlay(s) to a functional component of a wireless device. Such application may be made strategically, as to attract the consumer to interact with the functional component. Strategic placement means placement of a mark in such a manner as to attract a user or consumer to use the component that has the mark.

Figure 5:
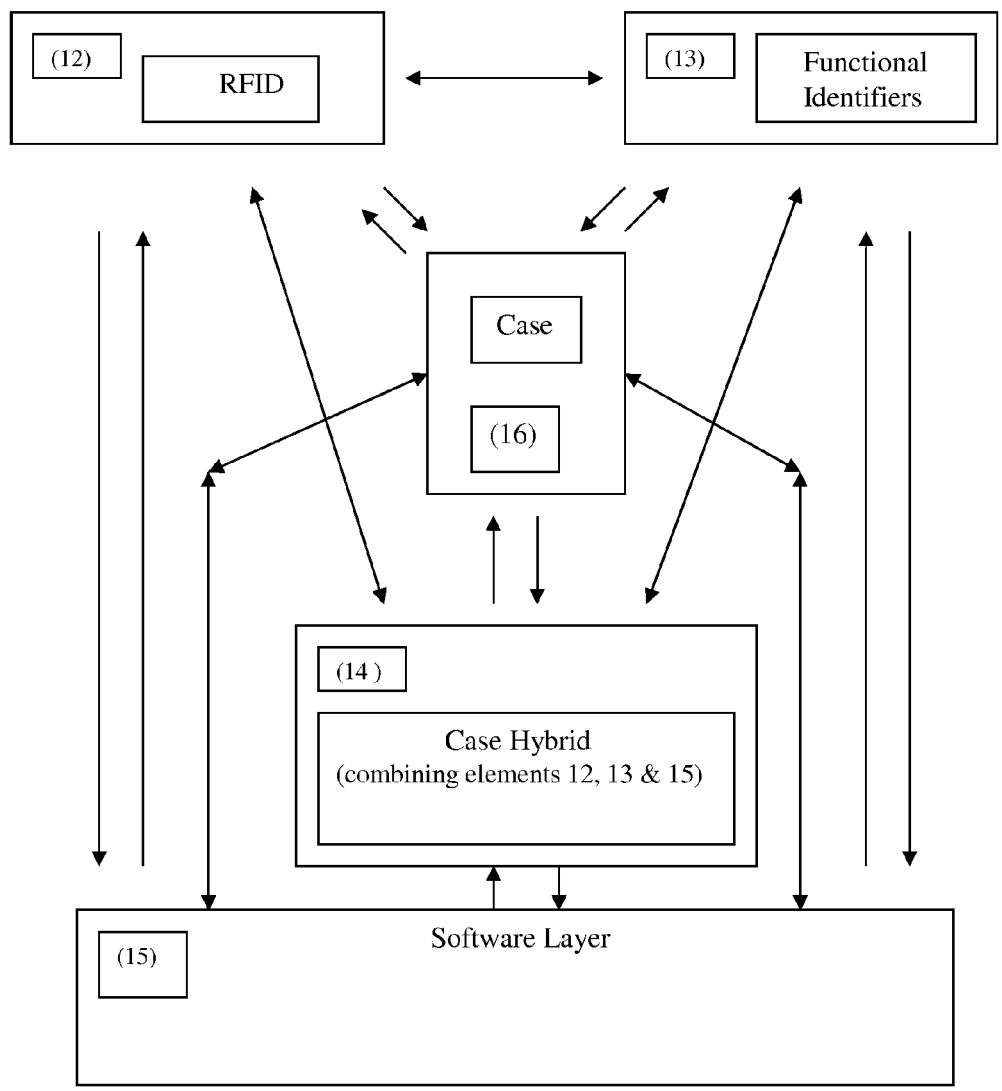
FIG. 5 is a schematic diagram showing relationships of components of the invention.

FIG. 5 is a schematic diagram showing relationships of components of the invention, namely RFID/NFC technology 12 included in the housing or case including, but not limited to, all connective components and/or embedded components or circuitry internal and/or external to the device itself and/or associated software 16; functional key overlays 13 included in the case or housing including, but not limited to, all connective components and/or embedded components or circuitry internal and/or external to the device itself and/or associated software; a hybrid 14 case including both RFID/NFC technology 12 and functional key overlays 13; and a software layer or component 15, running on a chip within the case including, but not limited to, all connective components and/or embedded components or circuitry internal to the device itself and associated software 16 interacting with all other components. The schematic of FIG. 5 illustrates the various relationships acting in combination to form a total system, in part selectively combined, and/or separately, as appropriate for a given application or use of the present invention.

More specifically, Radio Frequency Identification Technology (RFID/NFC) includes active RFID/NFC, passive RFID/NFC, newer technologies being developed for use with RFID/NFC, such as near field communication RFID/NFC, and combinations thereof. Active RFID and/or variations including NFC is typically either powered using a transponder-type system, which actively emits and/or receives a transmission or signal in some manner, or can function in a passive mode. A typical example of active RFID technology in use is highway toll booths. Passive RFID and/or variations including NFC technology is typically activated by a reflecting signal emitted from an external reader or electronic device. An example of passive RFID technology application is the Speedpass™ system commercially manufactured by Texas Instruments, Inc. and distributed by Exxon/Mobil, Inc. Newer technologies such as near field communication RFID/NFC, which in its simplest form is capable of combining secure communications wherein one device touches a second device for transmission/receiving communications between them. The foregoing is provided by way of example and not limitation, to facilitate explanation of the present invention. Any variation or application of RFID and/or variations including NFC, from any period, including future developments for RFID and/or variations including NFC, Zigbee, EMV and variations of embodiments including the same for single and multiple purposes, are intended to be included herein with the disclosure of the present invention and adapted thereto for various applications, as appropriate and evident to one of ordinary skill in the art. As set forth hereinabove, the RFID and/or variations including NFC technology, component or device and/or integration with the case is used to mean any incarnation of RFID/NFC technology—internal, external, and/or attached to the case or its surface, and combinations thereof.

Thus, a system for automated business transactions for electronic hand-held devices according to the present invention includes: a housing including, but not limited to, all connective components and/or embedded components or circuitry internal and/or external to the device itself and/or associated software for at least partially encasing an electronic mobile communications device; a radio frequency identifier (RFID/NFC) device; and a single/multi-function activatable component; wherein the device and RFID/NFC-enabled housing including, but not limited to, all connective components and/or embedded components or circuitry internal and/or external to the device itself and/or associated software is operable for communication with RFID/NFC transceivers when the device is located within a predetermined proximity of a transceiver; and wherein the single/multi-function activatable component and the RFID/NFC device cooperate to electronically initiate a business transaction when the device detects activation of the single/multi-function activatable component when the RFID/NFC is in communication with a RFID/NFC transceiver.

The RFID/NFC device can be embedded in the housing including, but not limited to, all connective components and/or embedded components or circuitry internal and/or external to the device itself and/or associated software or removably attached to the housing including, but not limited to, all connective components and/or embedded components or circuitry internal and/or external to the device and/or associated software or integrated with the housing including, but not limited to, all connective components and/or embedded components or circuitry internal and/or external to the device and/or associated software. The electronic mobile communications device is operable for completing a business transaction and/or action when inputs are detected by it to confirm the business transaction and/or action. The single/multi-function activatable component is preferably identified with an identifier selected from the group consisting of brands, marks, logos, trademarks and combinations thereof. The business transactions may include payments for services and/or products. The transactions and/or actions may also include gaming. The RFID/NFC device may be further operable to identify the user as having authorization to perform a predetermined function. The RFID/NFC device may be operable to identify the user as having authorization to pass through a security checkpoint and/or to identify the location of the user via a tracking system in communication with the RFID/NFC-enabled housing including, but not limited to, all connective components and/or embedded components or circuitry internal and/or external to the device itself and/or associated software. The single/multi-function activatable component may be constructed and configured to receive inputs by touch activation by a user.

Another embodiment of the present invention is a portable electronic device for business transactions including: a housing including, but not limited to, all connective components and/or embedded components or circuitry internal and/or external to the device itself and/or associated software; a radio frequency identifier (RFID/NFC) device; and a single/multi-function activatable component; wherein the RFID/NFC communicates with RFID/NFC or other transceivers, triggers, etc. when the device is located within a predetermined proximity of the transceivers; and wherein an account for business transactions is activated upon selection of the single/multi-function activatable component when the RFID/NFC is in communication with a RFID/NFC transceiver.

The RFID/NFC device can be embedded in the housing including, but not limited to, all connective components and/or embedded components or circuitry internal/and/or external to the device itself and/or associated software, removably attached to the housing including, but not limited to, all connective components and/or embedded components or circuitry internal and/or external to the device and/or associated software or integrated with the housing including, but not limited to, all connective components and/or embedded components or circuitry internal and/or external to the device and/or associated software. The electronic mobile communications device is operable for completing a business transaction when inputs are detected by it to confirm the business transaction. The single/multi-function activatable component is preferably identified with an identifier selected from the group consisting of brands, marks, logos, trademarks and combinations thereof. The business transactions and/or actions may include payments for services and/or products. The transactions may also include gaming. The RFID/NFC device may be further operable to identify the user as having authorization to perform a predetermined function. The RFID/NFC device may be operable to identify the user as having authorization to pass through a security checkpoint and/or to identify the location of the user via a tracking system in communication with the RFID/NFC-enabled housing including, but not limited to, all connective components and/ or embedded components or circuitry internal and/or external to the device itself and/or associated software. The single/multi-function activatable component may be constructed and configured to receive inputs by touch activation by a user.

Figure 6:
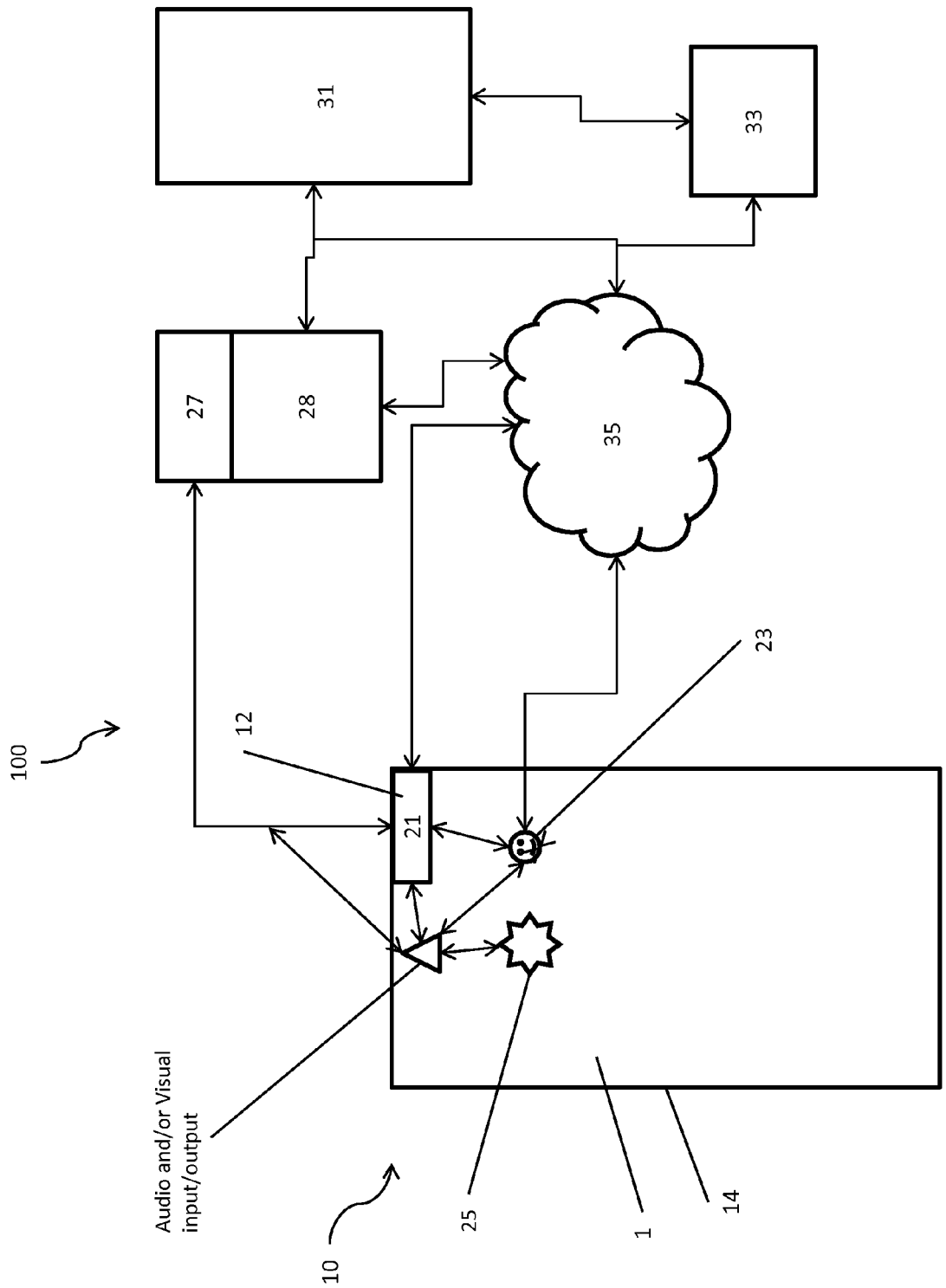
FIG. 6 is a schematic diagram showing relationships of a system according to the present invention.

FIG. 6 shows a system according to the present invention. The information & drawing representation(s) in the figures are symbolic. Actual usages may differ from symbolic arrangement of drawings and information actions and/or pathways. All symbolic drawing and information may be considered separately, together and or combined in a hybrid fashion Structure As shown in FIG. 6, the structures of the present invention include a system for automated transactions for electronic hand-held devices, generally described as 100, the system 100 including: a hand-held electronic mobile communication device 1, the device including a housing 14 including, but not limited to, all connective components and/or embedded components or circuitry internal to the device itself and/or associated software for at least partially and/or fully encasing the electronic mobile communications device. The housing including, but not limited to, all connective components and/or embedded components or circuitry internal and/or external to the device itself and/or associated software further including, but not limited to, a dedicated communication component (DCC) 21 and a dedicated activatable component 23. The dedicated activatable component 23 can be single or multiple-function and activates the DCC. The housing including, but not limited to, all connective components and/or embedded components or circuitry internal and/or external to the device itself and/or associated software may further include locators, such as GPS, RF and proximity locators 25.

The mobile communication device further includes an audio and/or visual input/output component 24.

The system further includes a trigger(s) and/or tag(s) 27 on goods and/or services offerings 28. The trigger 27 and/or tag signals its presence or is detected or passively by the dedicated communication component. Signals can be via waveform(s), signature detection(s), cue(s), pattern recognition, IR, RF, laser, barcode, visual, audio, RFID/NFC, RFID/NFC-Zigbee (etc.), RFID/NFC-Contactless, visual/voice/audio/motion/object recognition, advertising recognition, and the like.

The system further includes an application server 31 and a transaction server 33. The application server hosts applications, which can include but are not limited to transaction(s) and/or action(s) for goods and services and information and/or data links that may or may not include in singular, multiple and/or combinations thereof: Gaming, gambling, lottery, purchases, security clearance, user identification, purchases, virtual services, virtual purchases, virtual goods, emulated and virtual currency, virtual NFC and/or EMV capabilities and/or variations and/or virtualized combinations of singular or multiple examples of all specifications and claims and drawing material, rewards, tokens, points, rebates, coupons, prizes, debit transactions, credit transactions, currency exchanges, redemption, audio/visual trigger (or see previous adjectives), monetization therein via advertising and/or information/data linking/and/or subsidization linked to payment and/or prepaid account possibly with the maintenance of a certain balance for said subsidization etc (not limiting scope and/or definition).

The transaction server provides for transactions including: prepaid, debit, credit, redemption, stored value system(s), location based transaction systems, coupon, loyalty, gaming, currencies, subsidization, subsidization linked to payment and/or prepaid account possibly with the maintenance of a certain balance for said subsidization merchandising, promotion(s), advertising, lottery and/or other. These accounts and/or servers can be located in a cloud, on a server, on a device, portable and/or electronic-based device, and or input/output modification system(s) and/or trigger based monetization system with or without advertising capabilities etc. not limiting scope and/or definition.

Connections

The mobile device is operable for communication via the dedicated communication component with the trigger and/or tag through a variety of electronic and/or detection means including but not limited to RFID and/or RFID/NFC and/or transceiver(s) and/or IR and/or RF and/or Laser and/or Barcode and/or Visual and/or optical and/or display and/or audio and/or visual/voice/audio/motion/object recognition, signature(s)/waveform(s)/cue(s)/pattern recognition, RFID/NFC-Zigbee (etc.), RFID/NFC-Contactless, Recognition, Advertising Recognition, and/or motion activated, and/or electronic detection and the like means when the device is located within a predetermined proximity of the trigger and/or tag. The trigger and/or tag is in communication via a network 35 with the application server 31. The trigger may also be in communication with the transaction server 33. The dedicated activatable component is in connection via the network with the other components of the system, including the trigger and/or tag, the application server, and the transaction server and any of the aforesaid device(s) and/or capabilities. Various AI capabilities may be incorporated with such input/output capabilities and/or processes and may act to facilitate purpose(s) with or without additional user action.

The activatable component and the trigger/tag RFID/NFC communicate to electronically initiate a business transaction when the device detects activation of the activatable component when the RFID/NFC dedicated communication component is in communication with a RFID/NFC trigger/tag and/or trigger/tag of other means as listed previously.

The device may further include locators, such as GPS 22, RF or proximity locators that indicate the location of the device to a third party. In this manner the location of the device is known and this information can be used by the third party without the device being in communication with a trigger/tag.

FIG. 7 is a virtual reality embodiment of the present invention. This embodiment uses a virtual display system. The virtual reality display can automatically display the good or service offered.

The virtual display system can be separate from base device, integrated as one device, or multiple devices working together as a one and/or multi personal network(s).

The virtual reality embodiment includes a Display, Augmented Reality and/or Adaptive/Optics/Virtual Reality and/or Hyper Reality Environment, Retinal Projection, Projection, OLED, Graphene optimized materials, LCD, LED, HUD, Optical Display, laser projection or other means of displaying either on the mobile electronic communication device separately, together, or combined with secondary device(s) working with each other and/or primary device as an optical device, aid or network of singular and/or multiple devices.

In one embodiment shown in FIG. 7, the present invention includes a camera 41 and/or projector 43 and/or interactive optics/lense(s) 45 and/or display(s) 46 and/or display overlay(s)/media(s) 47 either hardware and/or software and/or integrated circuitry in the lens material and/or display, projection and/or overlay; forming an optical system.

The optical system in one or more embodiments as follows forming variations of Functional Identifiers (13) shown in FIG. 5 but able to interact separately, together and/or combined with RFID (12), Functional Identifiers (13), Case Hybrid (14), Software Layer (15) and or Case (16) and also combinable with other components. The various possible capabilities and/or embodiments separately and/or together are capable of interactive response between RFID, RFID-NFC, RFID-Zigbee, RFID-EMV-NFC, currencies, virtual currencies, objects, tokens, trigger(s), tags, codes, audio, visual based recognition, gesture based recognition and/or navigation, 2/3/4d bar codes (4d being described as an amalgamation of various identifiers together), locations, advertisements, marketing variations, merchandising recognition to include through various product/capability, service capability to in one instance create dynamic gameplay and/or offers, coupon and/or loyalty/discount offers and/or information barcodes and/or other interactive capable elements within the distance range of the optics and components capability. The optic(s) interactivity can be used for payment, gaming, wagering, payment, or the creation of social interaction. The recognition of virtual overlay and its visual elements are connected by wireless means, recognition, touch based transfer, matching of virtual symbols tags or objects to create a function of business transaction and/or action, advertising, videoconferencing, visual identification, audio and/or waveform identification and/or game play and/or use without requiring additional user action. These transactions may result in a purchase, location identification, directions, game play or other type of social interaction or communications, personal, entertainment, virtualized payment and/or hybrid realization of any or all of these elements separately, together and/or combined in a unique way. Furthermore, either via opt in or other means, it is possible that real time demographic, optical and/or eye tracking will present advertising-based feedback to a database.

Retinal activation through the optic ware or device, monitoring and/or control of such devices is possible as well as speech authentication and verbal/input and/or output direction and/or audio and/or visual interaction or audio and/or visual tag and/or trigger(s) including triggers that mat may occur by thought, thought control and/or biofeedback. The device may be stand alone or have the ability to reach out to the cloud for additional on demand computing resources and downlink of information that may have any location, information, business, service, gaming, transaction, and/or education component, data linking/input/output function or capability.

The optics/opticware may be integrated into wearable paraphernalia, glasses, jewelry, and/or clothing and associated and may be capable through wireless, RFID/NFC/Zigbee of interaction in data linking, upload/download of information and action triggers stored in the cloud or inside/outside the immediate range of the wireless device for access at a later time or for later use or immediate use.

Please note that these optics can also be considered adaptive in that they improve or adapt ones sight with the capability for information overlay augmentation for whatever purpose, additionally they may also be considered under other terms than virtual and/or augmented but also dynamic overlay of information onto physical environments or a combination that can transcend into a hyper reality environment. Further enhancements and variations are perceived but deleted herein for the sake of readability.

An example follows: In another embodiment the mobile device may be an audio triggered device and/or a wireless command activation device establishing or interacting with an account section that may activate or react to such elements as, a movie ticket and/or media which opens a connection for account creation, data linking, linking to an account or multiple accounts. This triggering may be deployed through social media interaction or audio command or signal and or be activated by the optical and/or audio and/or NFC tagging or otherwise, it may also then provide an immediate ability to upsell, data linking, information or provide access to privileges, pre-launches of games associated with that movie, radio, media, music, etc. The embodiment could also work in reverse where the game or media element launch links to the other movies, goods, services, discounts etc. A good, product, and/or service (which could also be a descriptor for an object) has the ability through in one instance NFC/RFID tags (but other ways such as 2d/3d/"4d" barcodes and/or audio and/or optical tag(s), trigger(s), command(s) etc.) to associate abilities, discounts, information, virtual-displayed information, and gaming characteristics through the mobile device or other. The account can function with the mobile device or the mobile device can be a conduit to the account.

Furthermore, the system can include a social media filter for filtering the good or service offerings, such that the user does not receive undesirable offerings. The social media provider can also provide authentication functions for the transaction.

Thus, a system for business wireless mobile transactions for electronic hand-held devices according to the present invention includes a mobile electronic communication device including a dedicated communication component and a dedicated activatable component; a RFID/NFC transceiver trigger, a good or service, and an application server; wherein the device and the dedicated communication component are operable for communication with the trigger when the device is located within a predetermined proximity of the trigger; and wherein the trigger activates the device to electronically initiate a business transaction for the good or service on the application server when the device detects activation of the dedicated activatable component by the user, thereby providing a system for semi-automated business transaction for electronic handheld devices. The system may further include a financial transaction server, wherein the application server initiates a financial transaction on the financial transaction server.

A method for business wireless mobile electronic transactions for electronic hand-held devices, the method steps including: providing a system for wireless mobile electronic transactions, the system including: mobile electronic communication device including a dedicated communication component and a dedicated activatable component; a RFID/NFC transceiver trigger, a good or service, and an application server; wherein the device and the dedicated communication component are operable for communication with the trigger when the device is located within a predetermined proximity of the trigger; activating the trigger to electronically initiate a business transaction for the good or service on the application server when the device detects activation of the dedicated activatable component by the user; thereby providing a method for business transactions for electronic handheld devices.

The method may further includes the steps of providing a financial transaction server in communication with the application server, and initiating a financial transaction on the financial transaction server.

The method may also including the steps of providing a virtual reality display for displaying the good or service, and displaying the good or service with the virtual reality display.

The method may further including the step of filtering the good or service offerings with a social media filter.

17. The method may further including the step of authenticating the transaction using a social media provider.

Certain modifications and improvements will occur to those skilled in the art upon a reading of the foregoing description. By way of example, new components or extensions may be added to a wireless device that may be labeled with a functional key overlay and/or overlay(s). Also, the present invention may be applied to cordless communication devices, such as traditional telephones operating with a cordless handset but with a corded base or receiver station.

All modifications and improvements have been deleted herein for the sake of conciseness and readability but are properly within the scope of the invention.

What is claimed is:

1. A system for conducting wireless mobile business transactions on electronic hand-held devices comprising:
   a electronic hand-held device, wherein the electronic hand-held device is encased by a housing, wherein the housing includes at least the following two types of functional components: a dedicated communication component and at least one dedicated activatable component;
   at least one RFID/NFC transceiver;
   an application server;
   wherein the dedicated communication component is operable for communication with at least one RFID/NFC transceiver when the electronic hand-held device is located within a predetermined proximity of the at least one RFID/NFC transceiver;
   wherein the at least one dedicated activatable component is dedicated to at least one good or service, and is activatable by a user when the communication is established between the electronic hand-held device and the at least one transceiver; and
   wherein activation of the at least one dedicated activatable component initiates a business transaction for the at least one good or service on the application server in a secure, user-authorized manner without requiring additional user action;
   thereby providing a system for conducting business transactions on electronic hand-held devices.

2. The system of claim 1, further including a financial transaction server, and wherein the application server initiates a financial transaction on the financial transaction server.

3. The system of claim 1, wherein the business transactions are selected from the group consisting of security clearance, attendance, and combinations thereof.

4. The system of claim 1, wherein the business transactions are selected from the group consisting of gaming, gambling, lottery purchases, virtual services, virtual purchases, virtual goods, emulated and virtual currency, virtual NFC and/or EMV capabilities and/or variations and/or virtualized combinations of singular or multiple examples of all specifications and claims and drawing material, rewards, tokens, points, rebates, coupons, prizes, debit transactions, credit transactions, currency exchanges, redemption, audio/visual trigger (or see previous adjectives), monetization therein via advertising and/or information/data linking/and/or subsidization linked to payment and/or prepaid account possibly with the maintenance of a certain balance for said subsidization and combinations thereof.

5. The system of claim 1, wherein the dedicated activatable component is marked with an identifier selected from the group consisting of brands, marks, names, symbols, logos, trademarks, labels, visual triggers, sounds, music, audio, signatures, audio triggers, waveform(s), and combinations thereof.

6. The system of claim 1, wherein the dedicated communication component is operable to identify the user as having authorization to perform a predetermined function.

7. The system of claim 1, wherein the dedicated communication component is operable to identify the user has having authorization to pass through a security checkpoint and/or to identify the location of the user via a tracking system in communication with the electronic hand-held device.

8. The system of claim 1, wherein the dedicated activatable component is constructed and configured to receive inputs by touch activation by the user.

9. The system of claim 1, further including a virtual reality display for displaying the good or service.

10. The system of claim 9, wherein the virtual reality display is selected from the group consisting of Augmented Reality and/or Adaptive/Optics/Virtual Reality and/or Hyper Reality Environment, Retinal Projection, Projection, OLED, Graphene optimized materials, LCD, LED, HUD, Optical Display, laser projection and combinations thereof.

11. The system of claim 1, further including a social media filter for filtering the good or service offerings.

12. The system of claim 1, wherein the transaction is authenticated and the authentication is provided by a social media provider.

13. A method for conducting wireless mobile electronic transactions on electronic hand-held devices, the method steps comprising:
   providing a system for wireless mobile electronic transactions, the system comprising a electronic hand-held device, at least one RFID/NFC transceiver and an application server; wherein the electronic hand-held device is encased in a housing, and wherein the housing includes at least the following two types of functional components: a dedicated communication component and at least one dedicated activatable component;
   the dedicated communication component communicating with at least one RFID/NFC transceiver when the electronic hand-held device is located within a predetermined proximity of the at least one RFID/NFC transceiver;
   a user activating at least one dedicated activatable component dedicated to the at least one good or service when the communication is established between the electronic hand-held device and the at least one RFID/NFC transceiver;
   the electronic hand-held device initiating a business transaction for the at least one good or service on the application server in a secure, user-authorized manner without requiring additional user action;
   thereby providing a method for business transactions for electronic hand-held devices.

14. The method of claim 13, further including the steps of: providing a financial transaction server in communication with the application server, and initiating a financial transaction on the financial transaction server.

15. The method of claim 13, further including the steps of: providing a virtual reality display for displaying the good or service, and displaying the good or service with the virtual reality display.

16. The method of claim 13, further including the step of filtering the good or service offerings with a social medial filter.

17. The method of claim 13, further including the step of authenticating the transaction using a social media provider.

* * * * *